(12) United States Patent
Sakamoto et al.

(10) Patent No.: US 8,400,677 B2
(45) Date of Patent: Mar. 19, 2013

(54) IMAGE PROCESSING APPARATUS, IMAGE FORMING SYSTEM, IMAGE PROCESSING METHOD AND COMPUTER READABLE MEDIUM FOR CALIBRATING PROFILES OF MULTIPLE SHEETS

(75) Inventors: Masaomi Sakamoto, Kanagawa (JP); Yoshiharu Hibi, Kanagawa (JP); Ryouichi Satoh, Kanagawa (JP); Toshifumi Takahira, Kanagawa (JP); Pauvi Sulistio, Kanagawa (JP); Kazuyuki Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 649 days.

(21) Appl. No.: 12/631,584

(22) Filed: Dec. 4, 2009

(65) Prior Publication Data
US 2010/0328688 A1    Dec. 30, 2010

(30) Foreign Application Priority Data

Jun. 24, 2009 (JP) .................................. 2009-149667

(51) Int. Cl.
*H04N 1/60* (2006.01)
(52) U.S. Cl. ......... 358/1.9; 358/1.1; 358/3.23; 358/504; 358/523
(58) Field of Classification Search .................... 358/1.1, 358/1.9, 2.1, 3.23, 3.24, 400, 401, 406, 500, 358/501, 504, 518, 523
See application file for complete search history.

(56) References Cited

U.S. PATENT DOCUMENTS

2004/0212816 A1* 10/2004 Tanabe et al. ................. 358/1.9
2005/0018222 A1*  1/2005 Yoshida ....................... 358/1.9

FOREIGN PATENT DOCUMENTS

| JP | 2001-094809 | 4/2001 |
| JP | 2005-303701 | 10/2005 |

* cited by examiner

*Primary Examiner* — Thomas D Lee
(74) *Attorney, Agent, or Firm* — Sughrue Mion, PLLC

(57) ABSTRACT

The image processing apparatus includes: a color conversion unit color-converting an image signal of a first color space into that of a second color space with a color conversion characteristic defining a correspondence relationship between the image signals; an adjustment unit adjusting the image signal of the second color space with adjustment conversion factor groups that is for adjusting it in accordance with a change in the color conversion characteristic, and is set for respective types of sheets on which an image is to be printed according to the image signal of the second color space; a calculation unit calculating the adjustment conversion factor groups; a memory storing an associating factor group associating, with each other, the adjustment conversion factor groups; and an update unit updating the adjustment conversion factor groups according to the calculated adjustment conversion factor group of one sheet and the stored associating factor group.

12 Claims, 7 Drawing Sheets

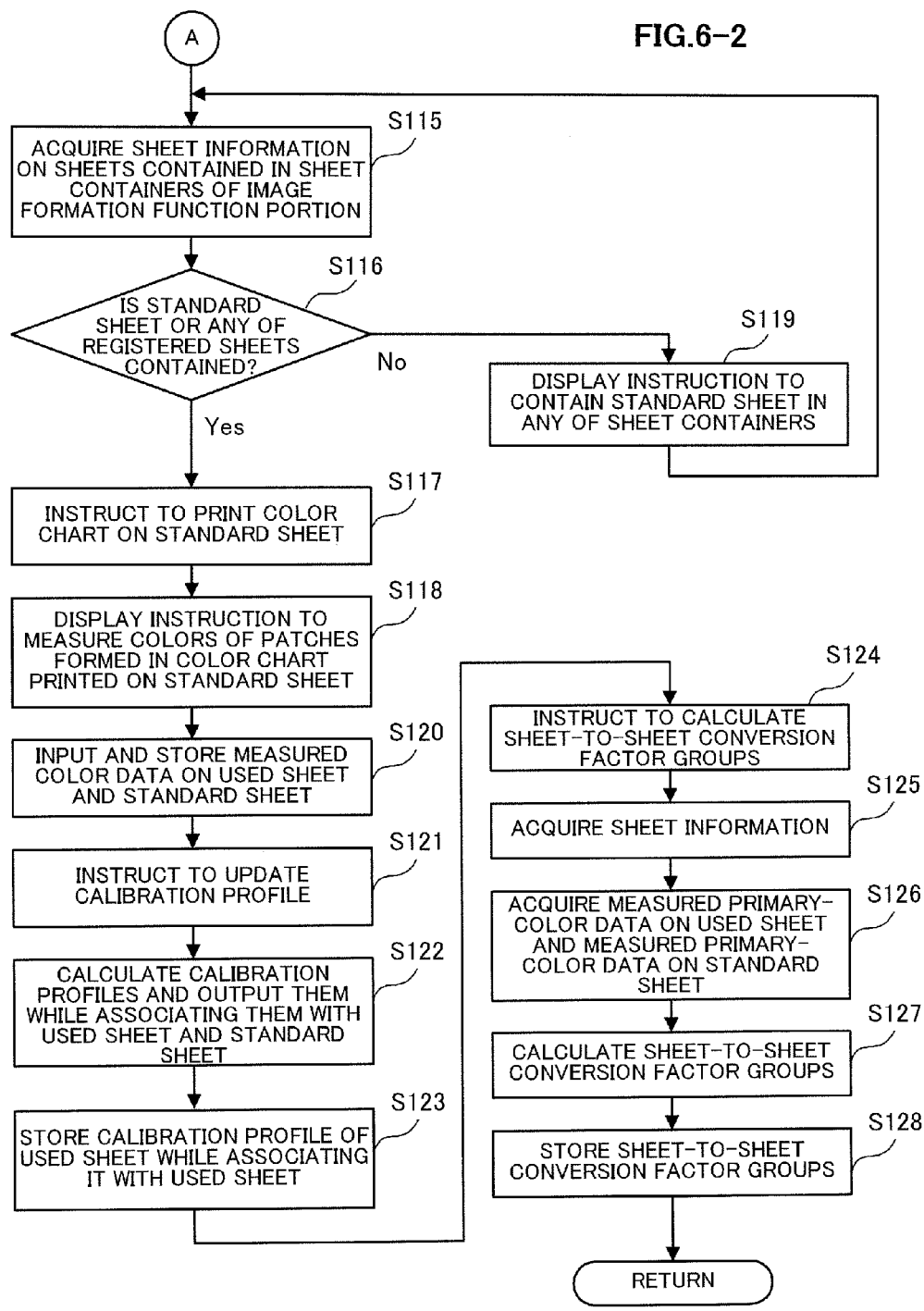

IMAGE PROCESSING APPARATUS, IMAGE FORMING SYSTEM, IMAGE PROCESSING METHOD AND COMPUTER READABLE MEDIUM FOR CALIBRATING PROFILES OF MULTIPLE SHEETS

CROSS REFERENCE TO RELATED APPLICATIONS

This application is based on and claims priority under 35 USC §119 from Japanese Patent Application No. 2009-149667 filed Jun. 24, 2009.

BACKGROUND

1. Technical Field

The present invention relates to an image processing apparatus, an image forming system, an image processing method and a computer readable medium storing a program.

2. Related Art

In general, in an image forming apparatus such as a color printer, since a color space of image signals to be inputted (input color space) and a color space used for image forming processing (output color space) are different from each other, color conversion processing for converting the color space is performed. This color conversion processing is generally performed on the basis of a correspondence relationship (table) between colors in the input color space and colors in the output color space. The colors in the input color space and the colors in the output color space are associated with each other in advance. This table differs according to the type of sheets to be used and varies due to, for example, a time-dependent factor. Therefore, adjustment (calibration) of the table is necessary for each type of the sheets to be used.

SUMMARY

According to an aspect of the present invention, there is provided an image processing apparatus including: a color conversion unit that color-converts an image signal of a first color space into an image signal of a second color space by using a color conversion characteristic defining a correspondence relationship between the image signal of the first color space and the image signal of the second color space; an adjustment unit that adjusts the image signal of the second color space, which is color-converted by the color conversion unit, by using adjustment conversion factor groups, the adjustment conversion factor groups being for adjusting the image signal of the second color space in accordance with a change in the color conversion characteristic, and being set for respective types of sheets on which an image is to be printed on the basis of the image signal of the second color space; a calculation unit that calculates the adjustment conversion factor groups set in the adjustment unit; a memory that stores an associating factor group associating, with each other, the adjustment conversion factor groups of the respective types of sheets set in the adjustment unit; and an update unit that updates the adjustment conversion factor groups of the respective types of sheets set in the adjustment unit, on the basis of one of the adjustment conversion factor groups of one sheet calculated by the calculation unit and the associating factor group stored in the memory.

BRIEF DESCRIPTION OF THE DRAWINGS

An exemplary embodiment of the present invention will be described in detail based on the following figures, wherein:

FIGS. 6-1 and 6-2 are flowcharts showing an example of contents of processing for updating calibration profiles performed in the color adjustment processor.

DETAILED DESCRIPTION

An exemplary embodiment of the present invention will be described below in detail with reference to the accompanying drawings.

<Description of Entire Image Forming Apparatus>

Figure 1:
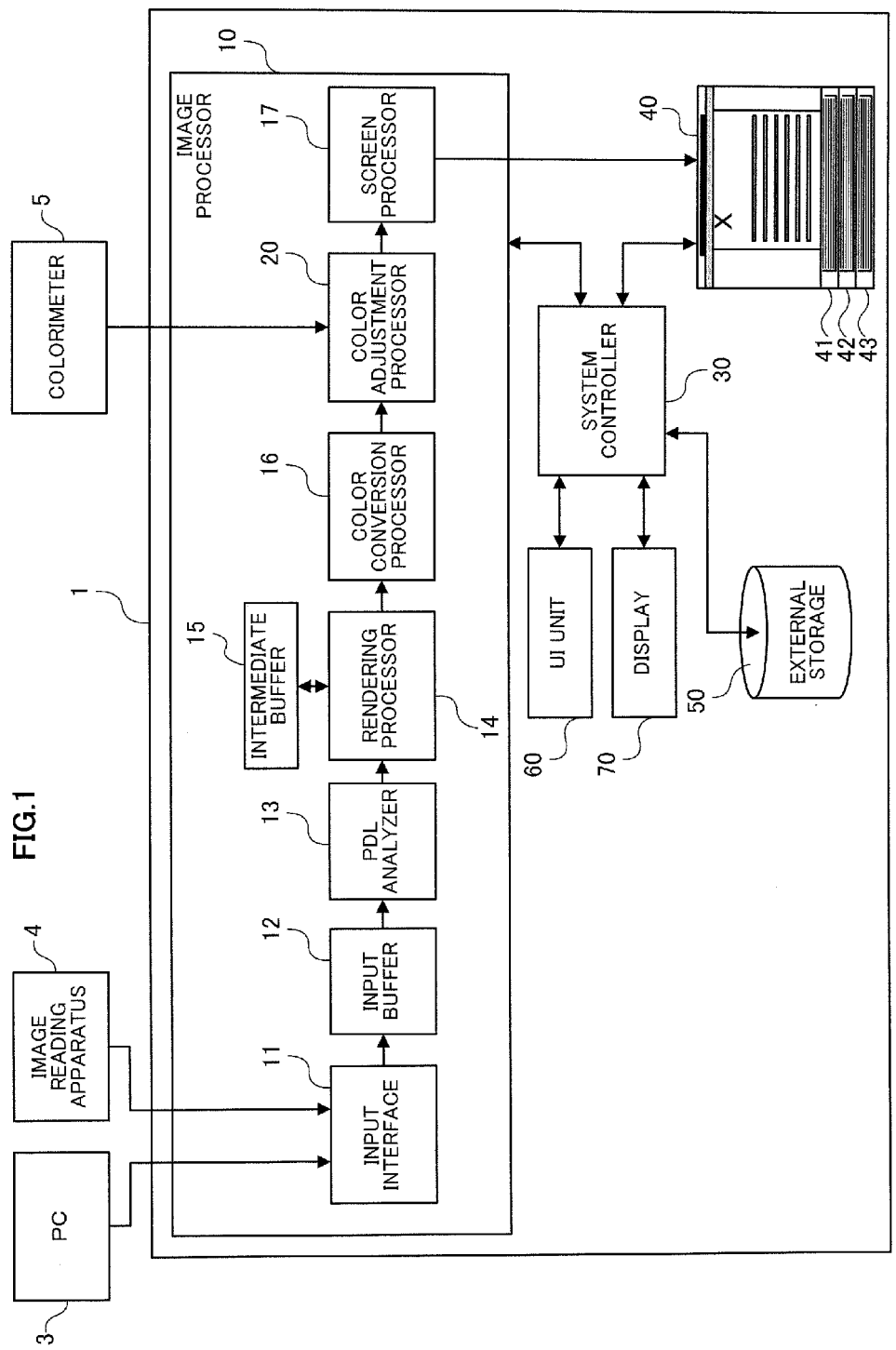
FIG. 1 is a diagram showing a configuration example of an image forming system including an image processor to which the exemplary embodiment is applied.

FIG. 1 is a diagram showing a configuration example of an image forming system 1 including an image processor 10 to which the exemplary embodiment is applied.

As shown in FIG. 1, the image forming system 1 includes the image processor 10 and a system controller 30. The image processor 10 is an example of an image processing unit (image processing apparatus) that is, for example, a digital color printer, and that performs image processing on image data inputted from an external apparatus such as a personal computer (PC) 3 or an image reading apparatus 4. The system controller 30 controls operation of the entire image forming system 1. Moreover, the image forming system 1 includes an external storage 50 and an image formation function unit 40. The external storage 50 stores therein various programs such as an operating system (OS) and application software to be executed by the image processor 10 or the system controller 30. The image formation function unit 40 is an example of an image forming unit that performs image formation on the basis of image data (an image signal) of each color component.

As the image formation function unit 40, an image forming engine employing an electrophotographic method, an ink-jet method or the like, which uses color materials of a C (cyan) color, M (magenta) color, Y (yellow) color, K (black) color, is used, for example. In addition, the image formation function unit 40 includes multiple sheet containers 41, 42 and 43 which contain different kinds of recording media (sheets). A user (a user, an administrator or the like of the image forming system 1, for example) selects a sheet contained in any one of the sheet containers 41, 42 and 43, and then image formation is performed.

Furthermore, the image forming system 1 includes a user interface (UI) unit 60 and a display 70. The UI unit 60 is an example of a receiving unit that receives an input of an instruction from a user. The display 70 is an example of a notifying unit that notifies a user of various kind of information.

<Description of Image Processor>

The image processor 10 includes an input interface 11, an input buffer 12 and a PDL analyzer 13. The input interface 11 is an example of an image data receiving unit that receives an input of image data from an external device such as the PC 3 or the image reading apparatus 4, for example. The input buffer 12 temporarily stores the image data received by the input interface 11. The PDL analyzer 13 analyzes the image data in a page description language (PDL) and then generates intermediate data. Moreover, the image processor 10 includes a rendering processor 14 and an intermediate buffer 15. The rendering processor 14 expands (renders) the intermediate data generated by the PDL analyzer 13 as image data for printing that is expressed by a group of pixels (such as a raster image data). The intermediate buffer 15 is used as a working area in rendering processing performed by the rendering processor 14.

Furthermore, the image processor 10 includes a color conversion processor 16, a color adjustment processor 20 and a screen processor 17. The color conversion processor 16 is an example of a color conversion unit that performs color conversion processing (color correction processing) on the rendered image data to generate image data of a color specification system suitable for print processing (for example, image data of a CMYK color space). The color adjustment processor 20 performs color adjustment processing (calibration) on the image data thus subjected to the color conversion processing by the color conversion processor 16, to compensate deterioration with age in color reproducibility and the like. The screen processor 17 performs screen processing on the image data thus subjected to the color conversion and color adjustment processing.

In the image processor 10, the input interface 11 receives image data outputted from the PC 3, the image reading apparatus 4 or the like, for example, and then transmits the image data to the input buffer 12. The input buffer 12 temporarily stores the image data acquired from the input interface 11, and outputs the image data to the PDL analyzer 13. The PDL analyzer 13 acquires the image data from the input buffer 12, and then generates, from the acquired image data, intermediate data for one page, for example. Thereafter, the PDL analyzer 13 outputs the generated intermediate data to the rendering processor 14. The rendering processor 14 performs rendering processing on the intermediate data acquired from the PDL analyzer 13, and then outputs the rendered raster image data (image data constituted of an array of a group of pixels) to the color conversion processor 16.

The color conversion processor 16 converts the acquired raster image data to color signals in an output color space (a second color space: a CYMK color space, for example) to be used in the print processing by the image formation function unit 40. Further, the color adjustment processor 20 performs color adjustment processing on the raster image data converted into the color signals in the output color space. Then, the color adjustment processor 20 outputs the raster image data thus subjected to the color conversion and color adjustment processing, to the screen processor 17.

The screen processor 17 performs screen processing on the multi-valued raster image data acquired from the color adjustment processor 20, and thereby generates binary image data (1-bit image data). Specifically, on the basis of the raster image data, which is multi-valued image information having a grey scale, the screen processor 17 generates binary image data spuriously representing the density of a halftone image by using colored dots, called halftone dots, each having a corresponding size. Then, the screen processor 17 outputs the generated binary image data to the image formation function unit 40.

Here, the image processor 10 may be integrally configured with the system controller 30, the image formation function unit 40 and the like, or may be configured separately from the system controller 30, the image formation function unit 40 and the like. In the case of configuring the image processor 10 separately, the image processor 10 is connected to each of the system controller 30, the image formation function unit 40 and the like via a network such as a local area network (LAN), a wide area network (WAN) or the Internet, for example. A communication line forming such a network may be a telephone line, a satellite communication line (a space transmission line of digital satellite broadcasting, for example) or the like.

Figure 2:
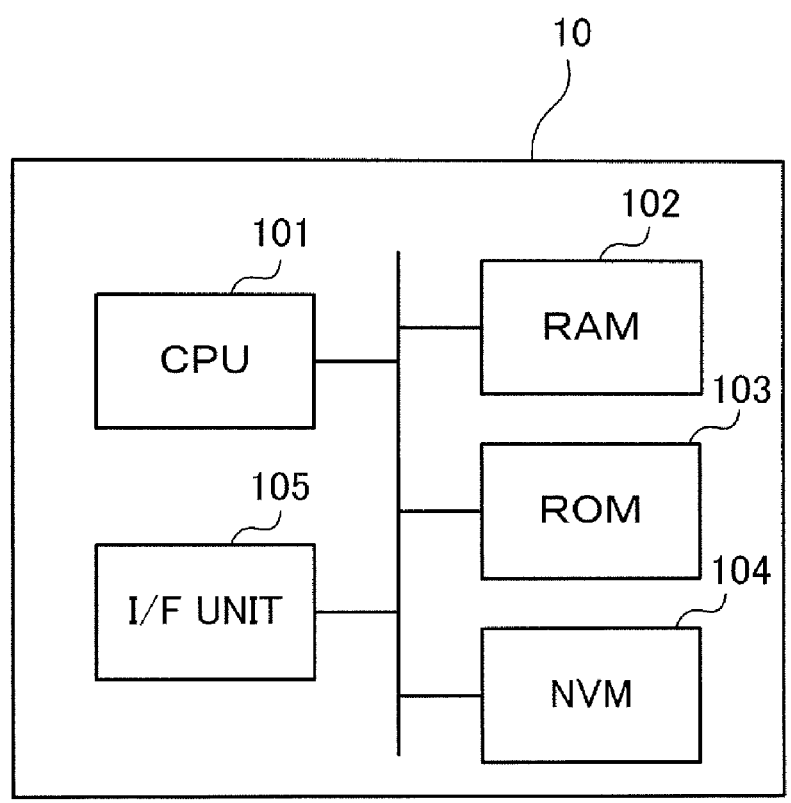
FIG. 2 is a block diagram showing an internal configuration of the image processor.

Here, FIG. 2 is a block diagram showing an internal configuration of the image processor 10. As shown in FIG. 2, for processing image data, the image processor 10 is provided with a CPU 101, a RAM 102, a ROM 103, a non-volatile memory (NVM) 104, and interface (I/F) unit 105. The CPU 101 executes digital calculation processing in accordance with a processing program set in advance. The RAM 102 is used as a working memory or the like for the CPU 101. The ROM 103 stores therein various setting values used in the processing in the CPU 101. The non-volatile memory (NVM) 104 such as a flash memory is a rewritable, holds data even in a case where the power supply is terminated, and is backed up by a battery. The I/F unit 105 controls an input and an output of signals with each of configuration units such as external devices including the PC 3, a colorimeter 5 and the like connected to the image processor 10, the system controller 30, the image formation function unit 40 and the like.

The CPU 101 reads the processing program from the external storage 50 and loads it into the main memory (RAM 102), and achieves a function of each of functional units such as the PDL analyzer 13, the rendering processor 14, the color conversion processor 16, the color adjustment processor 20, the screen processor 17 and the like.

It should be noted that, as another provision method on this processing program, the program may be provided while being prestored in the ROM 103, and be loaded into the RAM 102. In addition, when an apparatus is provided with a rewritable ROM 103 such as an EEPROM, only this program may be installed in the ROM 103 after the CPU 101 is set, and then may be loaded into the RAM 102. Moreover, this program may also be transmitted to the image processor 10 through a network such as the Internet and then installed in the ROM 103 of the image processor 10, and further loaded into the RAM 102. In addition, the program may be loaded into the RAM 102 from an external recording medium such as a DVD-ROM, a flash memory or the like.

<Description of Color Adjustment Processor>

Next, the color adjustment processor 20 included in the above-described image processor 10 will be described.

Figure 3:
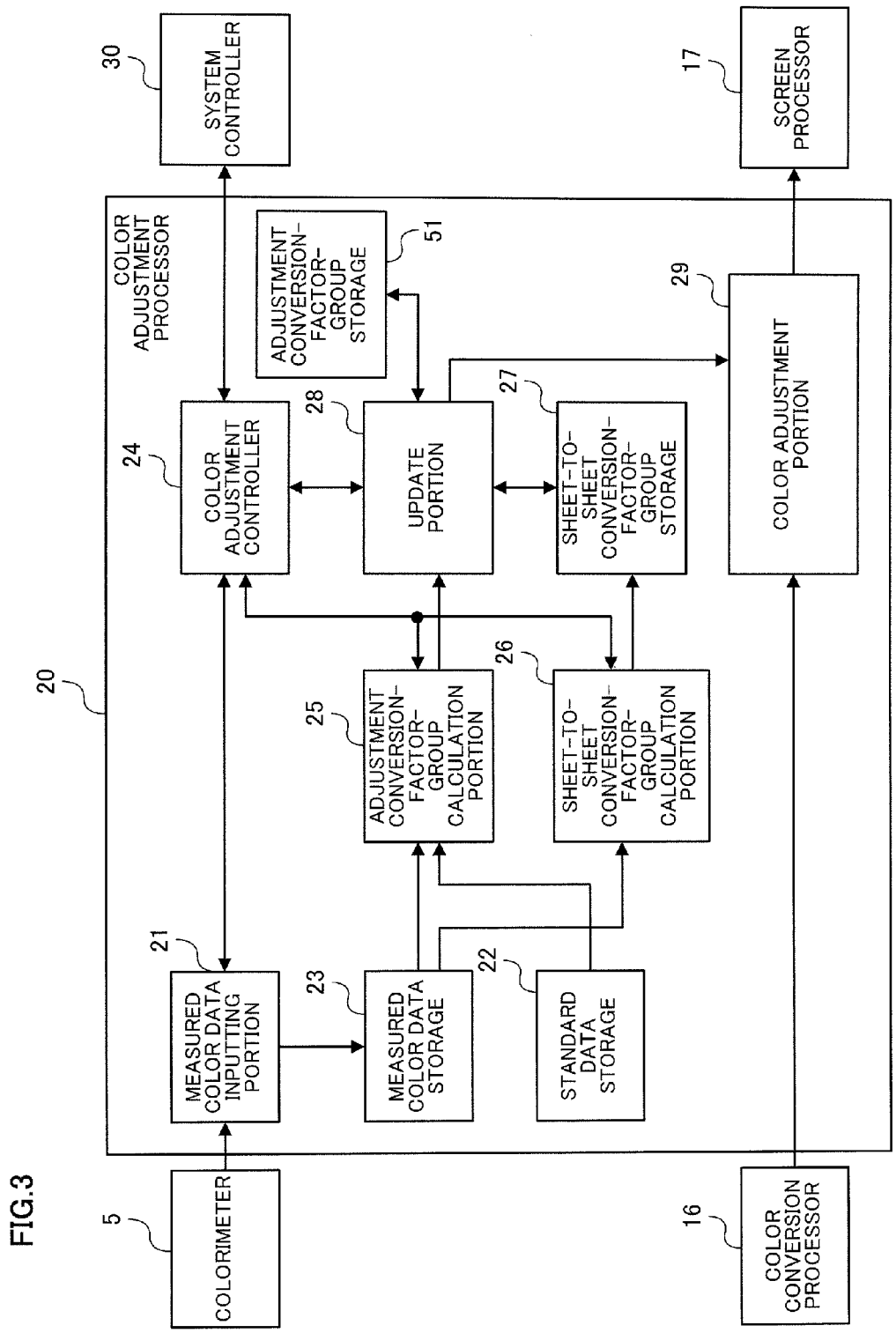
FIG. 3 is a block diagram showing a configuration of the color adjustment processor.

FIG. 3 is a block diagram showing a configuration of the color adjustment processor 20 of the exemplary embodiment.

As shown in FIG. 3, the color adjustment processor 20 includes a measured color data inputting portion 21, a measured color data storage 23, a standard data storage 22 and a color adjustment controller 24. The measured color data inputting portion 21 acquires measured color data generated by the colorimeter 5, from the colorimeter 5 (see also FIG. 1) that measures the colors of various color sample groups (color charts). The measured color data storage 23 stores therein the measured color data acquired by the measured color data inputting portion 21. The standard data storage 22 stores therein a color coordinate data pair ("standard data," below) used as a target in performing color conversion processing in the image forming system 1. The color adjustment controller 24 controls operation of the color adjustment processor 20.

The measured color data acquired by the measured color data inputting portion 21 is measured color data ($L^*$, $a^*$, $b^*$)

in a device-independent color space, for example, a L*a*b* color space, obtained by color measurement of a color chart by the colorimeter 5, the color chart constituted of, for example: 80 patches obtained by printing each of color components (a color component C, a color component M, a color component Y and a color component K), which are primary colors of an output color space (CMYK color space) of the image forming system 1 (image formation function unit 40), by the step of 5%; 625 (=$5^4$) patches in secondary to quartic colors obtained by printing mixed colors of the color components by changing each of the color components by the step of 20%; 1 patch in white; and the like.

The standard data stored in the standard data storage 22 is constituted of: color coordinate values (C, M, Y, K) of the output color space (second color space); and color coordinate values (L*, a*, b*) of the device-independent color space, which is, for example, the L*a*b* color space (first color space), as an input color space, corresponding to the color coordinate values (C, M, Y, K). The standard data provides ideal color conversion characteristics (a color conversion model) that are used as a target in color conversion processing by the color conversion processor 16 of the image processor 10. The standard data is stored, as a default (standard setting), in the standard data storage 22 constituted of a nonvolatile memory or the like at the time of factory shipment, for example. Here, a configuration may be made such that a user would be allowed to create standard data in accordance with a sheet type to be used or the like, and to then store the standard data in the standard data storage 22 via the UI unit 60 or the like, for example.

The color adjustment controller 24 acquires, from the system controller 30, information on, for example, a sheet type selected by a user at the UI unit 60 or the type of a sheet on which an image is formed by the image formation function unit 40 ("sheet information," below), and then notifies each of the functional units in the color adjustment processor 20 of the sheet information.

The measured color data inputting portion 21 acquires the sheet information from the color adjustment controller 24, and stores, in the measured color data storage 23, the measured color data generated by the colorimeter 5, while associating the measured color data with the sheet type on the basis of the acquired sheet information. In this event, the measured color data inputting portion 21 stores, in the measured color data storage 23, the measured color data generated by the colorimeter 5, so as to distinguish measured color data on patches of the respective color components (the color component C, the color component M, the color component Y and the color component K), which are primary colors ("measured primary-color data," below), from measured color data on the secondary to quartic colors.

<Description of Update of Calibration Profile Used for Color Adjustment>

Moreover, the color adjustment processor 20 includes an adjustment conversion-factor-group calculation portion 25, an update portion 28, an adjustment conversion-factor-group storage 51 and a color adjustment portion 29.

The adjustment conversion-factor-group calculation portion 25 is an example of a calculation unit, and calculates a conversion factor group for adjustment (a "calibration profile," below) to be used in calibration by the color adjustment processor 20. Then, the adjustment conversion-factor-group calculation portion 25 transmits the calculated calibration profile to the update portion 28.

The update portion 28 stores the calculated calibration profile in the adjustment conversion-factor-group storage 51. Moreover, the update portion 28 is an example of an update unit that updates the conversion factor group for adjustment, and updates a calibration profile set in the color adjustment portion 29, which is an example of an adjustment unit, with the newly calculated calibration profile. The color adjustment portion 29 performs color arrangement processing on image data (image signals) subjected to color conversion processing by the color conversion processor 16, by using the calibration profile.

Here, the "conversion factor group for adjustment (calibration profile)" is a multidimensional look-up table (multidimensional LUT; for example, four-dimensional LUT) that is used to color-adjust raster image data (C, M, Y, K) subjected to color conversion by the color conversion processor 16 and to thereby obtain "(C, M, Y, K)→($C_m$, $M_m$, $Y_m$, $K_m$)."

Moreover, the image data ($C_m$, $M_m$, $Y_m$, $K_m$) after adjustment by using such a calibration profile is also called "adjustment values" in this description.

The adjustment conversion-factor-group calculation portion 25 acquires, from the measured color data storage 23, the measured color data (L*, a*, b*) in the L*a*b* color space, on each of all the patches formed in the color chart. Moreover, the adjustment conversion-factor-group calculation portion 25 generates an actual data pair which is a combination of the actual data (C, M, Y, K) of each of the patches formed in the color chart and the acquired measured color data (L*, a*, b*) associated with each other. Then, by using the actual data pairs of the actual data (C, M, Y, K) and the measured color data (L*, a*, b*), the adjustment conversion-factor-group calculation portion 25 calculates color conversion characteristics from the input color space (L*a*b* color space) to the output color space (CMYK color space) ("inverse color conversion characteristics," below), the inverse color conversion characteristics representing the current color reproducibility in the image formation function unit 40.

Furthermore, the adjustment conversion-factor-group calculation portion 25 acquires the standard data from the standard data storage 22. Then, the adjustment conversion-factor-group calculation portion 25 calculates color conversion characteristics from the output color space (CMYK color space) to the input color space (L*a*b* color space) ("forward color conversion characteristics," below) to be used to estimate color coordinate values (L*, a*, b*) that are to be inputted to obtain color coordinate values (C, M, Y, K) printed by the image formation function unit 40.

Here, in the calculations of the inverse color conversion characteristics and the forward color conversion characteristics, employed is, for example, a method of performing statistical processing such as regression analysis by adding a weight to (weighting) the standard data (color coordinate data pair), a method of performing interpolation processing by simply calculating a weighted average for the standard data, a method of performing statistical processing by using a neural network that has learnt the standard data, or the like.

Then, the adjustment conversion-factor-group calculation portion 25 creates lattice points (C, M, Y, K) that divide each of the color components (the color component C, the color component M, the color component Y and the color component K) of the CMYK color space, by the predetermined step (for example, by the step of 10%), and converts each of the lattice points to color coordinate values (L*, a*, b*) of the L*a*b* color space by using the forward color conversion characteristics. Furthermore, the adjustment conversion-factor-group calculation portion 25 converts the color coordinate values (L*, a*, b*) of the L*a*b* color space to color coordinate values ($C_m$, $M_m$, $Y_m$, $K_m$) of the CMYK color space by using the inverse color conversion characteristics.

In this case, in conversion from the color coordinate values (L*, a*, b*) of the three-dimensional L*a*b* color space to the color coordinate values ($C_m$, $M_m$, $Y_m$, $K_m$) of the four-dimensional CMYK color space, a unique solution is not determined due to a lack of known numbers. For this reason, for example, calculation is performed under the restriction conditions that "a primary color is converted to a primary color" and "a secondary color is converted to a secondary color" in such a case.

In this way, the adjustment conversion-factor-group calculation portion 25 creates a calibration profile including combinations each formed of the lattice point (C, M, Y, K) and the color coordinate values ($C_m$, $M_m$, $Y_m$, $K_m$) calculated by using the forward color conversion characteristics and the inverse color conversion characteristics. When the lattice points (C, M, Y, K) that divide each color component by the step of 10%, for example, are used, the calibration profile is constituted of $11^4$ data pairs in total.

The adjustment conversion-factor-group calculation portion 25 calculates a calibration profile in advance, for example, of each of sheets A, B and C which are frequently used in the image forming system 1. In this case, for example, the sheets A, B and C are contained respectively in the sheet containers 41, 42 and 43 of the image formation function unit 40, and the image formation function unit 40 prints a color chart on the sheet A, the sheet B and the sheet C, successively. This is to ensure that conditions of the printing of the color chart, such as the state of the image formation function unit 40 and a thermal and humidity environment, are the same, and to increase the objectivity of the calibration profiles to be calculated under the influence of the printing conditions. Here, also in the case of calculating a calibration profile of a sheet other than the sheets A, B and C, occurrence of a gap in time (time lag) should be prevented in the printing of the color chart by immediately replacing the sheet contained in any of the sheet containers 41, 42 and 43.

Then, the adjustment conversion-factor-group calculation portion 25 acquires sheet information from the color adjustment controller 24, and outputs, to the update portion 28, each of the calculated calibration profiles (four-dimensional LUT) while associating the calibration profile with the corresponding sheet type (the name of the sheet A, B or C, or the like) on the basis of the acquired sheet information.

The update portion 28 stores, in the adjustment conversion-factor-group storage 51, each of the calibration profiles created by the adjustment conversion-factor-group calculation portion 25, while associating the calibration profile with the corresponding sheet type. The calibration profiles associated with the corresponding sheet type are held in the adjustment conversion-factor-group storage 51 while an update using a calibration profile newly calculated by the adjustment conversion-factor-group calculation portion 25 and an update using a "sheet-to-sheet conversion factor group" to be described later are performed. Moreover, the update portion 28 reads a calibration profile from the adjustment conversion-factor-group storage 51, and then replaces (updates) a calibration profile set in the color adjustment portion 29, when needed.

<Description of Associating Calibration Profiles Calculated Respectively for Sheets>

Next, the color adjustment processor 20 includes a sheet-to-sheet conversion-factor-group calculation portion 26 and a sheet-to-sheet conversion-factor-group storage 27.

The sheet-to-sheet conversion-factor-group calculation portion 26 calculates an associating factor group (a "sheet-to-sheet conversion factor group," below) that associates with each other calibration profiles calculated for different types of sheets. For example, when the sheet A is set as a "standard sheet," the sheet-to-sheet conversion-factor-group calculation portion 26 calculates an sheet-to-sheet conversion factor group that associates calibration profiles of each two sheets with each other, by using the standard sheet (sheet A) as a center, such as an sheet-to-sheet conversion factor group that associates the calibration profile of the sheet A with the calibration profile of the sheet B and an sheet-to-sheet conversion factor group that associates the calibration profile of the sheet A with the calibration profile of the sheet C. Here, the "standard sheet" is a sheet that is used as a center for the association of the calibration profiles of various sheets.

The sheet-to-sheet conversion-factor-group storage 27 is an example of a memory that stores the associating factor groups, and stores therein the sheet-to-sheet conversion factor groups each of which associates the calibration profiles of two different types of sheets calculated by the sheet-to-sheet conversion-factor-group calculation portion 26. The sheet-to-sheet conversion-factor-group storage 27 mainly stores therein the sheet-to-sheet conversion factor groups each of which associates with each other the calibration profile of the standard sheet and the calibration profile of a sheet other than the standard sheet.

In the following, a method of calculating the sheet-to-sheet conversion factor group will be described by taking, as an example, a case in which the calibration profile of the sheet A (standard sheet) is associated with the calibration profile of the sheet B.

The sheet-to-sheet conversion-factor-group calculation portion 26 firstly acquires sheet information from the color adjustment controller 24, and thereby recognizes that sheets to be associated are the standard sheet (sheet A) and the sheet B. Moreover, the sheet-to-sheet conversion-factor-group calculation portion 26 acquires, from the measured color data storage 23, measured primary-color data ($L_A^*$, $a_A^*$, $b_A^*$) on the sheet A and measured primary-color data ($L_B^*$, $a_B^*$, $b_B^*$) on the sheet B.

Then, the sheet-to-sheet conversion-factor-group calculation portion 26 calculates a color difference $D_A$ of the measured primary-color data ($L_A^*$, $a_A^*$, $b_A^*$) on the sheet A from reference blank paper data ($L_0^*$, $a_0^*$, $b_0^*$), and a color difference $D_B$ of the measured primary-color data ($L_B^*$, $a_B^*$, $b_B^*$) on the sheet B from the reference blank paper data ($L_0^*$, $a_0^*$, $b_0^*$). The color differences $D_A$ and $D_B$ are respectively Euclidean distances (one-dimensional values) between the measured primary-color data ($L_A^*$, $a_A^*$, $b_A^*$) and reference blank paper data ($L_0^*$, $a_0^*$, $b_0^*$) and between the measured primary-color data ($L_B^*$, $a_B^*$, $b_B^*$) and the reference blank paper data ($L_0^*$, $a_0^*$, $b_0^*$) in the L*a*b* color space. Here, the reference blank paper data ($L_0^*$, $a_0^*$, $b_0^*$) is a measured value of the sheet A, which is a standard sheet, in blank, for example.

Furthermore, the sheet-to-sheet conversion-factor-group calculation portion 26 creates data pairs each associating one of the calculated color differences $D_A$ and $D_B$ with one of actual data (C, 0, 0, 0), (0, M, 0, 0), (0, 0, Y, 0) and (0, 0, 0, K) used in generating the primary-color patches (monochromatic patches of the respective color components). Specifically, the sheet-to-sheet conversion-factor-group calculation portion 26 creates data pairs ($D_A$, C), ($D_A$, M), ($D_A$, Y) and ($D_A$, K) for the measured primary-color data on the sheet A, and data pairs ($D_B$, C), ($D_B$, M), ($D_B$, Y) and ($D_B$, K) for the measured primary-color data on the sheet B. Here, C, M, Y and K are respectively color component values of actual data used in printing the primary-color patches.

Then, the sheet-to-sheet conversion-factor-group calculation portion 26 calculates, for each of the color components (primary colors), a correction curve representing a correspondence relationship between a corresponding one of adjustment values ($C_{mA}$, $M_{mA}$, $Y_{mA}$, $K_{mA}$) of the calibration profile of the sheet A and a corresponding one of adjustment values ($C_{mB}$, $M_{mB}$, $Y_{mB}$, $K_{mB}$) of the calibration profile of the sheet B, on the basis of the data pairs ($D_A$, C), ($D_A$, M), ($D_A$, Y) and ($D_A$, K) for the sheet A and data pairs ($D_B$, C), ($D_B$, M), ($D_B$, Y) and ($D_B$, K) for the sheet B. Here, although the actual data C, M, Y and K of each of the patches are identical, the color differences $D_A$ and $D_B$ of the patch have different values since the measured primary-color data on the sheet A and the measured primary-color data on the sheet B have different values. Accordingly, by associating the actual data C, M, Y and K on each of the patches with the adjustment values ($C_{mA}$, $M_{mA}$, $Y_{mA}$, $K_{mA}$) of the sheet A and the adjustment values ($C_{mB}$, $M_{mB}$, $Y_{mB}$, $K_{mB}$) of the sheet B in consideration of the color differences $D_A$ and $D_B$, which are one-dimensional values, the adjustment values ($C_{mA}$, $M_{mA}$, $Y_{mA}$, $K_{mA}$) of the sheet A and the adjustment values ($C_{mB}$, $M_{mB}$, $Y_{mB}$, $K_{mB}$) of the sheet B are associated with each other. Thereby, the sheet-to-sheet conversion-factor-group calculation portion 26 calculates, for each of the color components (primary colors), a correction curve (one-dimensional LUT) for each pair of the adjustment value of the sheet A and the adjustment value of the sheet B thus associated, by using interpolation operation, matching processing or the like.

For example, as to the color component C, by obtaining such a C coordinate value $C_{B1}$, for the sheet B that the color difference would be the same as that of a C coordinate value $C_{A1}$, for the sheet A ($D_{A1}=D_{B1}$), from the data pair ($D_A$, C) on the sheet A and the data pair ($D_B$, C) on the sheet B, a one-dimensional LUT (sheet A→sheet B conversion factor group) that associates the adjustment value $C_{mA}$ for the sheet A and the adjustment value $C_{mB}$ for the sheet B with each other is created. Similarly, by obtaining such a C coordinate value $C_{A2}$ for the sheet A that the color difference would be the same as that of a C coordinate value $C_{B2}$ for the sheet B ($D_{B2}=D_{A2}$), a one-dimensional LUT (sheet B→sheet A conversion factor group) that associates the adjustment value $C_{mB}$ for the sheet B and the adjustment value $C_{mA}$ for the sheet A with each other is created. This applies also to the color component M, the color component Y and the color component K.

Here, an example of converting three-dimensional data in the L*a*b* color space into one-dimensional data by obtaining color differences from the reference blank paper data is used to calculate a correction curve (one-dimensional LUT). However, the method of calculating a correction curve (one-dimensional LUT) is not limited thereto. For example, when a colorimeter capable of measuring a density value at the same time as obtaining measured color values in the L*a*b* color space is used, the density values may be used to calculate a one-dimensional LUT, instead of the measured color values (L*, a*, b*).

Figure 4:
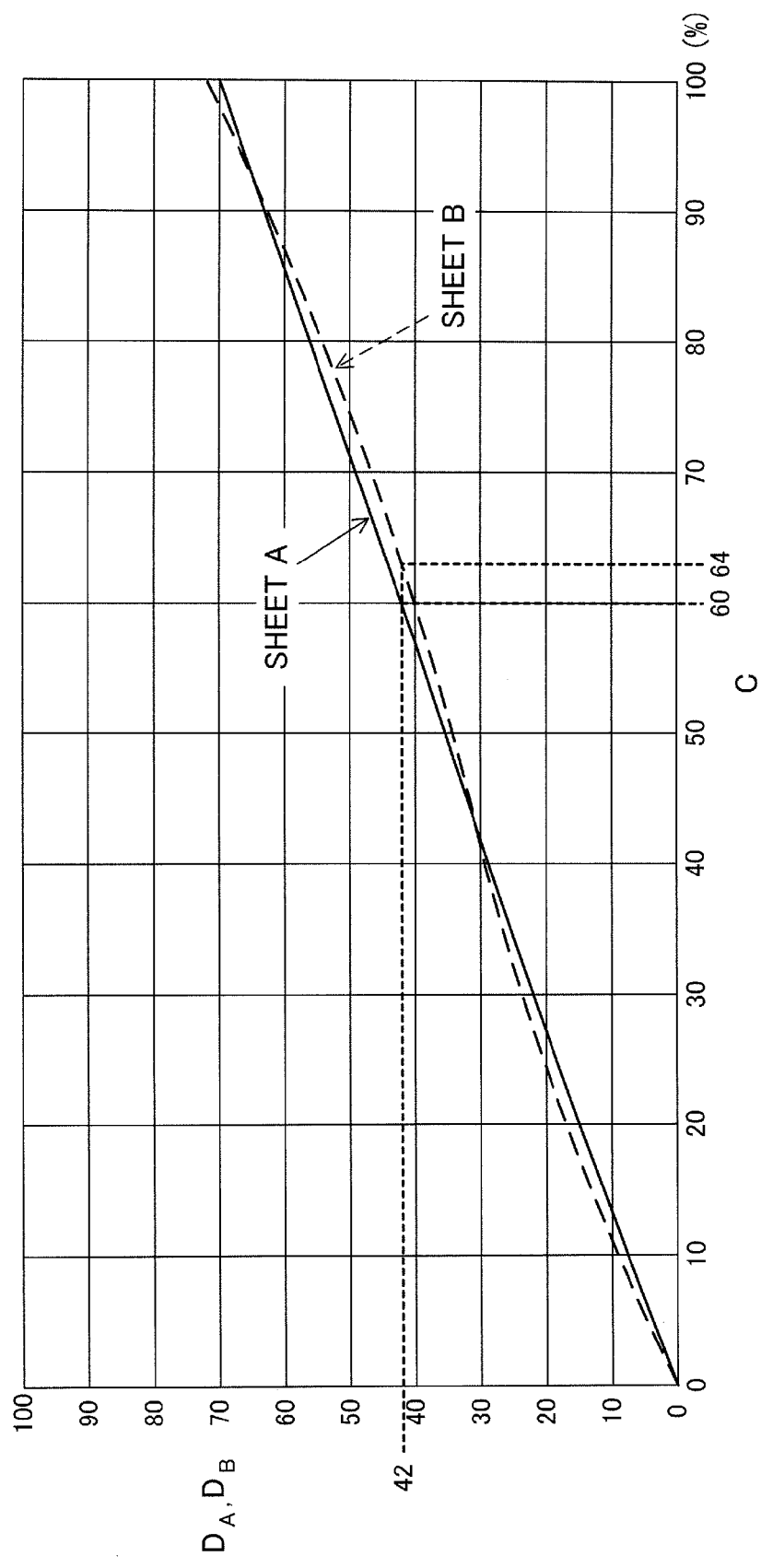
FIG. 4 is a graph illustrating association of the adjustment value of the color component C for the sheet A and the adjustment value of the color component C for the sheet B in consideration of the color differences.

FIG. 4 is a graph illustrating association of the adjustment value ($C_{mA}$) of the color component C for the sheet A and the adjustment value ($C_{mB}$) of the color component C for the sheet B in consideration of the color differences $D_A$ and $D_B$. In FIG. 4, the horizontal axis represents actual data (C), and the vertical axis represents the color differences $D_A$ and $D_B$. Moreover, the solid line is a curve calculated from the data pair ($D_A$, C) for the sheet A by using interpolation operation, for example, and the broken line is a curve calculated from the data pair ($D_B$, C) for the sheet B in the same way. For example, at $D_A=D_B=42$, C=60% for the sheet A while C=64% for the sheet B. Hence, the C coordinate value $C_A=60\%$ of the sheet A and the C coordinate value $C_B=64\%$ of the sheet B are associated with each other. Thereby, a one-dimensional LUT that associates the adjustment value 60% for the sheet A with the adjustment value 64% for the sheet B is created (sheet A→sheet B conversion factor group: $x_B, =F_{A \to B}, (x_A)$). Similarly, a one-dimensional LUT that associates the adjustment value 64% for the sheet B with the adjustment value 60% for the sheet A is created (sheet B→sheet A conversion factor group: $x_A = F_{B \to A}, (x_B)$).

By obtaining a combination ($C_A$, $C_B$) of a C coordinate value of the sheet A and a C coordinate value of the sheet B, which are actual data, satisfying $D_A=D_B$, for the entire area C=0% to 100%, a correction curve representing the correspondence relationship between the adjustment value $C_{mA}$ of the color component C for the sheet A and the adjustment value $C_{mB}$ of the color component C for the sheet B is created.

Here, the same applies also to the color component M, the color component Y and the color component K, and x=C, M, Y or K in each of the above-described conversion factor groups (the same applies to the following).

Figure 5:
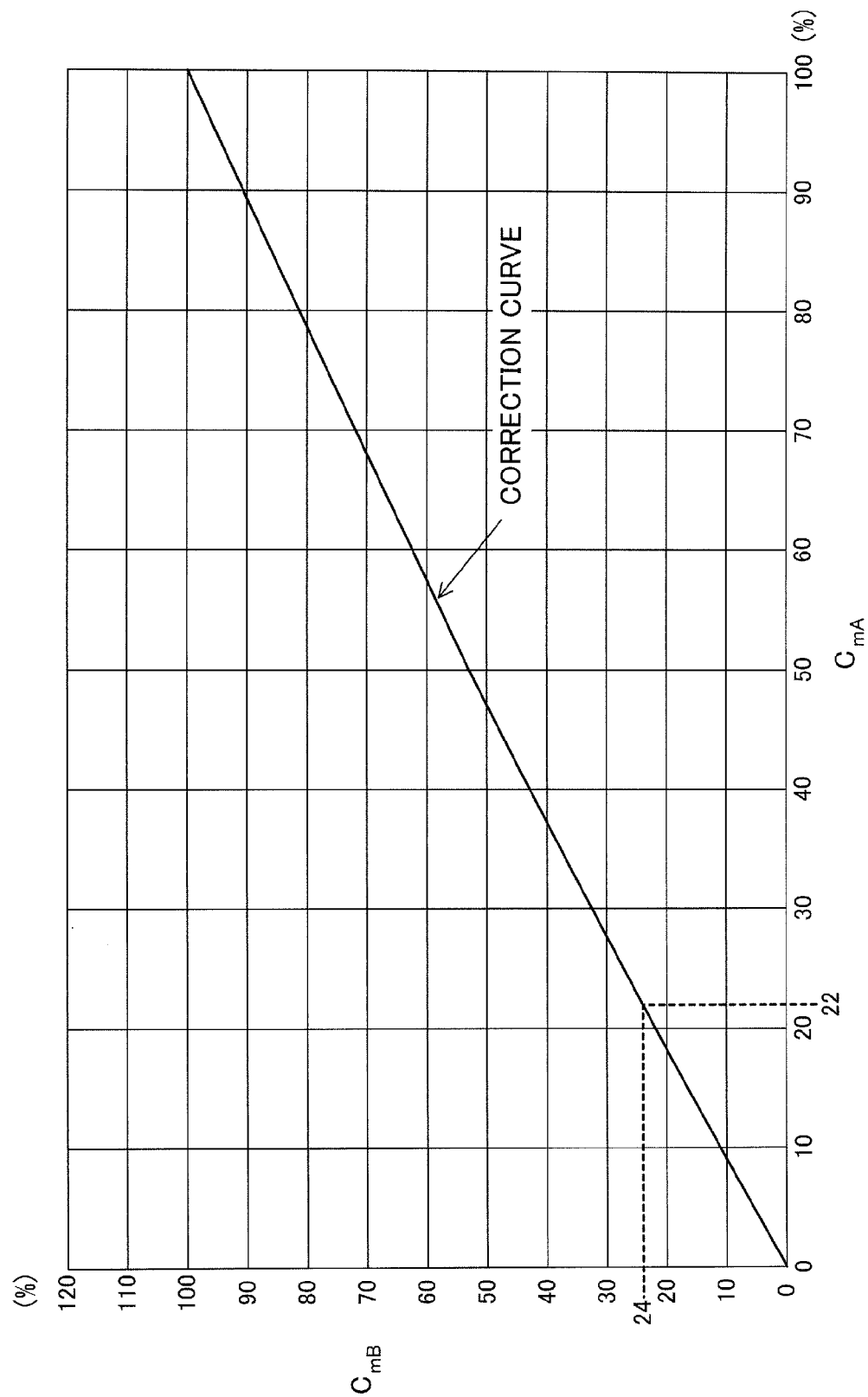
FIG. 5 is a graph showing an example of a correction curve representing a correspondence relationship between the adjustment value of the color component C for the sheet A and the adjustment value of the color component C for the sheet B.

FIG. 5 is a graph showing an example of a correction curve representing a correspondence relationship between the adjustment value $C_{mA}$ of the color component C for the sheet A and the adjustment value $C_{mB}$ of the color component C for the sheet B by associating the C coordinate value $C_A$ on the sheet A and the C coordinate value $C_B$ on the sheet B at which the color differences are the same ($D_A=D_B$) (matching processing). By the correction curve shown as an example in FIG. 5, the adjustment value $C_{mA}=22$ for the sheet A is associated with the adjustment value $C_{mB}=24$ for the sheet B, for example.

In this way, the sheet-to-sheet conversion-factor-group calculation portion 26 calculates a correction curve shown as an example in FIG. 5, as a one-dimensional LUT (sheet A→sheet B conversion factor group: $x_{mB}=F_{A \to B}, (x_{mA})$) constituted of the combination of the adjustment value $C_{mA}$ (1% to 100%) for the sheet A and the adjustment value $C_{mB}$ (1% to 100%) for the sheet B associated with the adjustment value $C_{mA}$, for example (here, $x_m=C_m$, $M_m$, $Y_m$, $K_m$; the same applies to the following). In this case, although each of the adjustment value $C_{mA}$ and the adjustment value $C_{mB}$ is in the range of 1% to 100%, a correction curve may be estimated within the range of 1% to higher than 100% (120%, for example) for the adjustment value $C_{mA}$, and the adjustment value $C_{mB}$ on the basis of the tendency of the correction curve at the time of associating the C coordinate value $C_A$ on the sheet A and the C coordinate value $C_B$ on the sheet B. Thereby, if any one of the adjustment value $C_{mA}$ and the adjustment value $C_{mB}$ is eventually associated with a value larger than 100% in adjustment, using a one-dimensional LUT, of the calibration profiles of the sheets, clipping processing or so-called rounding processing may be performed to set the adjustment values $C_{mA}$ or the adjustment values $C_{mB}$ associated with the value larger than 100% to be associated with 100%.

As described above, the sheet-to-sheet conversion-factor-group calculation portion 26 calculates a correction curve for the color component C shown as an example in FIG. 5, as a one-dimensional LUT constituted of the combination of the adjustment value $C_{mA}$ (=1% to 100%) for the sheet A and the adjustment value $C_{mB}$ (=1% to 100%) for the sheet B associated with the adjustment value $C_{mA}$, for example. In this event, the sheet-to-sheet conversion-factor-group calculation portion 26 calculates both a one-dimensional LUT associating the adjustment value $C_{mA}$ for the sheet A with the adjustment value $C_{mB}$ for the sheet B and a one-dimensional LUT associating the adjustment value $C_{mB}$ for the sheet B with the adjustment value $C_{mA}$ for the sheet A, as described above. The same applies also to the color component M, the color component Y and the color component K.

Then, the sheet-to-sheet conversion-factor-group calculation portion 26 outputs (registers) the calculated one-dimensional LUTs to the sheet-to-sheet conversion-factor-group storage 27. Thereby, the sheet-to-sheet conversion-factor-group storage 27 stores therein, for each of the color components, one-dimensional LUTs that associate the calibration profile of the sheet A and the calibration profile of the sheet B with each other in both directions.

The sheet-to-sheet conversion-factor-group calculation portion 26 also calculates, for each of the color components, one-dimensional LUTs that associate the calibration profile of the sheet A and the calibration profile of each of the other sheets in both directions, and stores the calculated one-dimensional LUTs in the sheet-to-sheet conversion-factor-group storage 27.

<Description of Update of Calibration Profile of Each Sheet>

When the UI unit 60 receives, from a user, an instruction to update a calibration profile used in the color adjustment portion 29, the system controller 30 instructs the image formation function unit 40 to send out, for example, the sheet A from the sheet container 41 containing the standard sheet (sheet A: an example of a third sheet), and to then form the above-mentioned color chart on the sheet A. Moreover, the system controller 30 transmits, to the color adjustment controller 24 of the color adjustment processor 20, a command to update the calibration profile and sheet information on the type of the sheet ("sheet A") on which the color chart is formed by the image formation function unit 40.

Furthermore, the system controller 30 instructs, by using the display 70, the user to measure the colors of the patches formed in the color chart by using the colorimeter 5. When the user measures the colors of the patches formed in the color chart by using the colorimeter 5 according to the instruction, the measured color data inputting portion 21 acquires the measured color data obtained by the colorimeter 5, and stores the measured color data in the measured color data storage 23.

The color adjustment controller 24 of the color adjustment processor 20 instructs the adjustment conversion-factor-group calculation portion 25 and the update portion 28 to update the calibration profile. In response to the instruction, the adjustment conversion-factor-group calculation portion 25 acquires the measured color data from the measured color data storage 23 and the standard data from the standard data storage 22. Then, the adjustment conversion-factor-group calculation portion 25 calculates a calibration profile (an example of one of adjustment conversion factor groups of a third one of the sheets) by using the acquired measured color data and standard data, and outputs, to the update portion 28, the calculated calibration profile while associating the calibration profile with the sheet type ("sheet A") on the basis of the sheet information acquired from the color adjustment controller 24.

The update portion 28 stores, in the adjustment conversion-factor-group storage 51, the calibration profile calculated by the adjustment conversion-factor-group calculation portion 25, while associating the calibration profile with the sheet A. Thereby, the calibration profile of the sheet A stored in the adjustment conversion-factor-group storage 51 is rewritten.

Subsequently, the update portion 28 acquires, from the sheet-to-sheet conversion-factor-group storage 27, the one-dimensional LUT (sheet A→sheet B conversion factor group: $C_{mB}=F_{A \to B}(C_{mA})$) that associates the adjustment value $C_{mA}$ for the sheet A with the adjustment value $C_{mB}$ for the sheet B (an example of a fourth one of the sheets) and a one-dimensional LUT (sheet A→sheet C conversion factor group: $C_{mC}=F_{A \to C}(C_{mA})$) that associates the adjustment value $C_{mA}$ for the sheet A with the adjustment value $C_{mC}$ for the sheet C (an example of the fourth one of the sheets). Then, the update portion 28 calculates a calibration profile of the sheet B (an example of one of the adjustment conversion factor groups of the fourth one of the sheets) on the basis of the calibration profile of the sheet A stored in the adjustment conversion-factor-group storage 51 by using the sheet A→sheet B conversion factor group.

Specifically, the update portion 28 performs calculation for each of the color component values $C_{mA}$, $M_{mA}$, $Y_{mA}$ and $K_{mA}$ of each grid of the adjustment values ($C_{mA}$, $M_{mA}$, $Y_{mA}$, $K_{mA}$) of the calibration profile of the sheet A by using the one-dimensional LUT (the sheet A→sheet B conversion factor group: $x_B = F_{A \to B}(x_A)$) of the corresponding color component. For example, the update portion 28 performs calculation $F_{A \to B}(C_{mA})$ for the color component $C_{mA}$ of each grid of the calibration profile of the sheet A. Similarly, the update portion 28 performs calculation $F_{A \to B}(M_{mA})$, $F_{A \to B}(Y_{mA})$ or $F_{A \to B}(K_{mA})$ for each of the color components $M_{mA}$, $Y_{mA}$ and $K_{mA}$ of each grid of the calibration profile of the sheet A. Thereby, the update portion 28 creates "($C_{mA}$, $M_{mA}$, $Y_{mA}$, $K_{mA}$)→($C_{mB}$, $M_{mB}$, $Y_{mB}$, $K_{mB}$): $x_{mB}=F_{A \to B}(x_{mA})$" as a calibration profile of the sheet B. Here, $C_{mB}=F_{A \to B}(C_{mA})$, $M_{mB}=F_{A \to B}(M_{mA})$, $Y_{mB}=F_{A \to B}(Y_{mA})$ and $K_{mB}=F_{A \to B}(K_{mA})$.

Similarly, the update portion 28 creates a calibration profile "($C_{mA}$, $M_{mA}$, $Y_{mA}$, $K_{mA}$)→($C_{mC}$, $M_{mC}$, $Y_{mC}$, $K_{mC}$): $x_{mC}=F_{A \to C}(x_{mA})$" of the sheet C on the basis of the calibration profile of the sheet A by using the one-dimensional LUT (sheet A→sheet C conversion factor group: $x_C=F_{A \to C}(x_A)$). The one-dimensional LUT (sheet A→sheet C conversion factor group: $x_C=F_{A \to C}(x_A)$) used here converts ($C_{mA} \to C_{mC}$) for the color component C, ($M_{mA} \to M_{mC}$) for the color component M, ($Y_{mA} \to Y_{mC}$) for the color component Y and ($K_{mA} \to K_{mC}$) for the color component K, and $C_{mC}=F_{A \to C}(C_{mA})$, $M_{mC}=F_{A \to C}(M_{mA})$, $Y_{mC}=F_{A \to C}(Y_{mA})$ and $K_{mC}=F_{A \to C}(K_{mA})$.

The update portion 28 stores, in the adjustment conversion-factor-group storage 51, the calculated calibration profiles of the sheet B and the sheet C while associating the calibration profiles with the sheet B and the sheet C, respectively. Thereby, the calibration files of the sheet B and the sheet C stored in the adjustment conversion-factor-group storage 51 are rewritten.

If in the amount of change of the calibration profile to be updated, for example the calibration profile of the sheet A, is estimated to be small, the adjustment conversion-factor-group calculation portion 25 calculates, as a one-dimensional LUT of each of the color components, a correspondence relationship between the current measured color data and the last measured color data on the basis of the current measured color data and the last measured color data by using the same method as that for the above-described calculation of the sheet-to-sheet conversion factor group, for example, and the update portion 28 may update the calibration profile stored in the adjustment conversion-factor-group storage 51, by using the one-dimensional LUTs. Alternatively, the adjustment conversion-factor-group calculation portion 25 may newly create parts of the calibration profile, for example, three-dimensional LUT parts of the color component Y, the color component M and the color component C or tertiary color parts generated by mixing three color components (the color component C, the color component M and the color component Y), and the update portion 28 may thereby perform an update by rewriting corresponding adjustment values with the newly created adjustment values while using previously set adjustment values as the other adjustment values.

<Description of Update Using Calibration Profile of Sheet Other than Standard Sheet>

Next, a description will be given of a case in which the standard sheet (sheet A) is not contained in any of the sheet containers 41 to 43 of the image formation function unit 40 when the UI unit 60 receives an instruction to update a calibration profile used in the color adjustment portion 29.

In such a case, the system controller 30 searches the sheet containers 41 to 43 for a sheet (for example, the sheet B or the sheet C) for which a sheet-to-sheet conversion factor group is calculated so as to associate the sheet with the standard sheet. Then, if a sheet, for example, the sheet B (an example of a sixth one of the sheets), for which a sheet-to-sheet conversion factor group is calculated is contained in the sheet container 42, the system controller 30 instructs the image formation function unit 40 to send out the sheet B from the sheet container 42 and to then form the above-mentioned color chart on the sheet B. Moreover, the system controller 30 transmits, to the color adjustment controller 24 of the color adjustment processor 20, a command to update the calibration profile and sheet information on the type of the sheet ("sheet B") on which the color chart is formed by the image formation function unit 40.

Furthermore, the system controller 30 instructs, by using the display 70, the user to measure the colors of the patches formed in the color chart by using the colorimeter 5. When the user measures the colors of the patches formed in the color chart by using the colorimeter 5 according to the instruction, the measured color data inputting portion 21 acquires the measured color data obtained by the colorimeter 5, and stores the measured color data in the measured color data storage 23.

The color adjustment controller 24 of the color adjustment processor 20 instructs the adjustment conversion-factor-group calculation portion 25 and the update portion 28 to update the calibration profile. In response to the instruction, the adjustment conversion-factor-group calculation portion 25 acquires the measured color data from the measured color data storage 23 and the standard data from the standard data storage 22. Then, the adjustment conversion-factor-group calculation portion 25 calculates a calibration profile (an example of one of the adjustment conversion factor groups of the sixth one of the sheets) by using the acquired measured color data and standard data, and outputs, to the update portion 28, the calculated calibration profile while associating the calibration profile with the sheet type ("sheet B") on the basis of the sheet information acquired from the color adjustment controller 24.

The update portion 28 stores, in the adjustment conversion-factor-group storage 51, the calibration profile calculated by the adjustment conversion-factor-group calculation portion 25, while associating the calibration profile with the sheet B. Thereby, the calibration profile of the sheet B stored in the adjustment conversion-factor-group storage 51 is rewritten.

Subsequently, the update portion 28 acquires, from the sheet-to-sheet conversion-factor-group storage 27, the one-dimensional LUT (sheet B→sheet A conversion factor group: $x_A=F_{B \to A}(x_B)$) that associates the adjustment value $C_{mB}$ for the sheet B (the example of the sixth one of the sheets) with the adjustment value $C_{mA}$ for the sheet A (an example of a seventh one of the sheets) and a one-dimensional LUT (sheet A→sheet C conversion factor group: $x_C=F_{A \to C}(x_A)$) that associates the adjustment value $C_{mA}$ for the sheet A (the example of the seventh one of the sheets) with the adjustment value $C_{mC}$ for the sheet C (an example of a fifth one of the sheets). Then, the update portion 28 calculates a calibration profile of the sheet A on the basis of the calibration profile of the sheet B stored in the adjustment conversion-factor-group storage 51 by using the sheet B→sheet A conversion factor group.

Specifically, the update portion 28 performs calculation processing ("single calculation", below) for each of the color component values $C_{mB}$, $M_{mB}$, $Y_{mB}$ and $K_{mB}$ of each grid of the adjustment values ($C_{mB}$, $M_{mB}$, $Y_{mB}$, $K_{mB}$) of the calibration profile of the sheet B by using the one-dimensional LUT (the sheet B→sheet A conversion factor group: $x_A=F_{B \to A}(x_B)$) of the corresponding color component. For example, the update portion 28 performs calculation $F_{B \to A}(C_{mB})$ for the color component C of each grid of the calibration profile. Similarly, the update portion 28 performs calculation $F_{B \to A}(M_{mB})$, $F_{B \to A}(Y_{mB})$ or $F_{B \to A}(K_{mB})$ for each of the color components $M_{mB}$, $Y_{mB}$ and $K_{mB}$ of each grid of the calibration profile. Thereby, the update portion 28 creates "($C_{mB}$, $M_{mB}$, $Y_{mB}$, $K_{mB}$)→($C_{mA}$, $M_{mA}$, $Y_{mA}$, $K_{mA}$): $x_{mA}=F_{B \to A}(x_{mB})$" as a calibration profile of the sheet A. Here, $C_{mA}=F_{B \to A}(C_{mB})$, $M_{mA}=F_{B \to A}(M_{mB})$, $Y_{mA}=F_{B \to A}(Y_{mB})$ and $K_{mA}=F_{B \to A}(K_{mB})$.

Meanwhile, a calibration profile of the sheet C (an example of a sheet-to-sheet conversion factor group of the fifth one of the sheets) is calculated as follows. Specifically, double calculation processing ("double calculation," below) is performed so that a one-dimensional LUT (sheet B→sheet A conversion factor group: $x_A=F_{B \to A}(x_B)$) of a corresponding color component would be firstly calculated, and thereafter a one-dimensional LUT (sheet A→sheet C conversion factor group: $x_C=F_{A \to A}(x_A)$) would be calculated, for each of the color component values $C_{mB}$, $M_{mB}$, $Y_{mB}$ and $K_{mB}$ of each grid of the adjustment values ($C_{mB}$, $M_{mB}$, $Y_{mB}$, $K_{mB}$) of the calibration profile of the sheet B (an example of a sheet-to-sheet conversion factor group of the sixth one of the sheets).

By using the one-dimensional LUT (sheet B→sheet A conversion factor group: $x_A=F_{B \to A}(x_B)$) and the one-dimensional LUT (sheet A→sheet C conversion factor group: $x_C=F_{A \to C}(x_A)$), calculations $F_{A \to C}(F_{B \to A}(C_{mB}))$, $F_{A \to C}(F_{B \to A}(M_{mB}))$, $F_{A \to C}(F_{B \to A}(Y_{mB}))$ and $F_{A \to C}(F_{B \to A}(K_{mB}))$ are performed respectively for the color components $C_{mB}$, $M_{mB}$, $Y_{mB}$ and $K_{mB}$ of each grid of the calibration profile. Thereby, as a calibration profile of the sheet C, "($C_{mB}$, $M_{mB}$, $Y_{mB}$, $K_{mB}$)→($C_{mC}$, $M_{mB}$, $Y_{mC}$, $K_{mC}$): $x_{mC}=F_{B \to C}(x_{mB})$" is created. Here, $C_{mC}=F_{A \to C}(F_{B \to A}(C_{mB}))$, $M_{mC}=F_{A \to C}(F_{B \to A}(M_{mB}))$, $Y_{mC}=F_{A \to C}(F_{B \to A}(Y_{mB}))$ and $K_{mC}=F_{A \to C}(F_{B \to A}(K_{mB}))$.

In this case, a one-dimensional LUT (sheet B (an example of the sixth one of the sheets)→sheet C (the example of the fifth one of the sheets) conversion factor group: $x_C=F_{B \to C}(x_B)$) may be calculated in advance from the one-dimensional LUT (sheet B→sheet A conversion factor group) and the one-dimensional LUT (sheet A→sheet C conversion factor group). In other words, the one-dimensional LUT (sheet B→sheet C conversion factor group: $x_C=F_{B \to C}(x_B)$) that converts ($C_B \to C_C$) for the color component C, ($M_B \to M_C$) for the color component M, ($Y_B \to Y_C$) for the color component Y and ($K_B \to K_C$) for the color component K may be calculated in advance. Similarly, the one-dimensional LUT (sheet C→sheet B conversion factor group: $x_B=F_{C \to B}(x_C)$) may be calculated in advance from the one-dimensional LUT (sheet C→sheet A conversion factor group: $x_A=F_{C \to A}(x_C)$) and the one-dimensional LUT (sheet A→sheet B conversion factor group: $x_B=F_{A \to B}(x_A)$).

Thereby, by multiplying each of the color component values $C_{mB}$, $M_{mB}$, $Y_{mB}$ and $K_{mB}$ of each grid of the adjustment values ($C_{mB}$, $M_{mB}$, $Y_{mB}$, $K_{mB}$) of the calibration profile of the sheet B (the example of the sheet-to-sheet conversion factor group of the sixth one of the sheets) by the one-dimensional LUT (sheet B→sheet C conversion factor group: $x_C=F_{B \to C}(x_B)$) of the corresponding color component, the calibration profile of the sheet C ($x_{mC}=F_{B \to C}(x_{mB})$, an example of the sheet-to-sheet conversion factor group of the fifth one of the sheets) is calculated by single calculation processing (single calculation).

Here, the update portion 28 may perform an update based on the calibration profile of a sheet (the standard sheet, for example) calculated by the adjustment conversion-factor-group calculation portion 25, by limiting the target of the update to a sheet for which the UI unit 60 receives an instruction of update from a user. Specifically, such a configuration is made that the UI unit 60 receives, from a user, designation of a target sheet of which the calibration profile is updated. For example, such a configuration is made that, if a user designates the sheet A, which is the standard sheet, and the sheet B as update targets at the UI unit 60, the system controller 30 would instruct the color adjustment controller 24 of the color adjustment processor 20 to limit the sheet types for the calibration profile update to the sheet A and the sheet B. In this case, no update is performed on the calibration profile of a sheet other than the limited ones, for example, the sheet C.

Moreover, the one-dimensional LUT (sheet-to-sheet conversion factor group) stored (registered) in the sheet-to-sheet conversion-factor-group storage 27 in advance may be configured to be divided into multiple sheet categories. For example, set are: a "plain sheet category" for multiple plain sheet groups for which sheet-to-sheet conversion factor groups are created by using, as a center, a standard sheet, which is one type of plain sheets, having standard sheet quality; and a "coated sheet category" for multiple coated sheet groups for which sheet-to-sheet conversion factor groups are created by using, as a center, a standard sheet that is one type of so-called coated sheets whose surface is subjected to gloss treatment.

In this case, such a configuration is made that the UI unit 60 would receive designation of a target sheet category for which an update of the calibration profile is to be performed. With this configuration, the target sheet to which the update portion 28 is to perform a sheet-to-sheet calibration profile update is limited, and hence the calculation processing is reduced in load. Moreover, since updates of the calibration profiles are collectively performed for the sheet groups of the same category, convenience is improved.

Furthermore, such a configuration may be made that the UI unit 60 would receive, from a user, designation of a sheet type to be used in an update of a calibration profile. Upon receipt of the designation, the system controller 30 instructs the image formation function unit 40 to send out a sheet from a sheet container containing the designated sheet (the standard sheet (sheet A), for example) therein, and to form the above-mentioned color chart on the sheet. Moreover, the system controller 30 notifies the color adjustment controller 24 of the color adjustment processor 20 of sheet information on the sheet on which the color chart is formed. The color adjustment controller 24 performs processing for updating the calibration profile on the basis of the sheet information acquired from the system controller 30.

In the present exemplary embodiment, described is the configuration of using four colors, for example, the color C, the color M, the color Y and the color K, as color materials used in the image formation system 1 (image formation function unit 40). However, the present invention is similarly applicable to a configuration of using more than four color materials, such as a configuration of using six colors, the light cyan color (LC), the dark cyan color (DC), the light magenta color (LM), the dark magenta color (DM), the color Y and the color K.

<Description of Procedure of Processing for Updating Calibration Profiles>

Figures 1, 6:
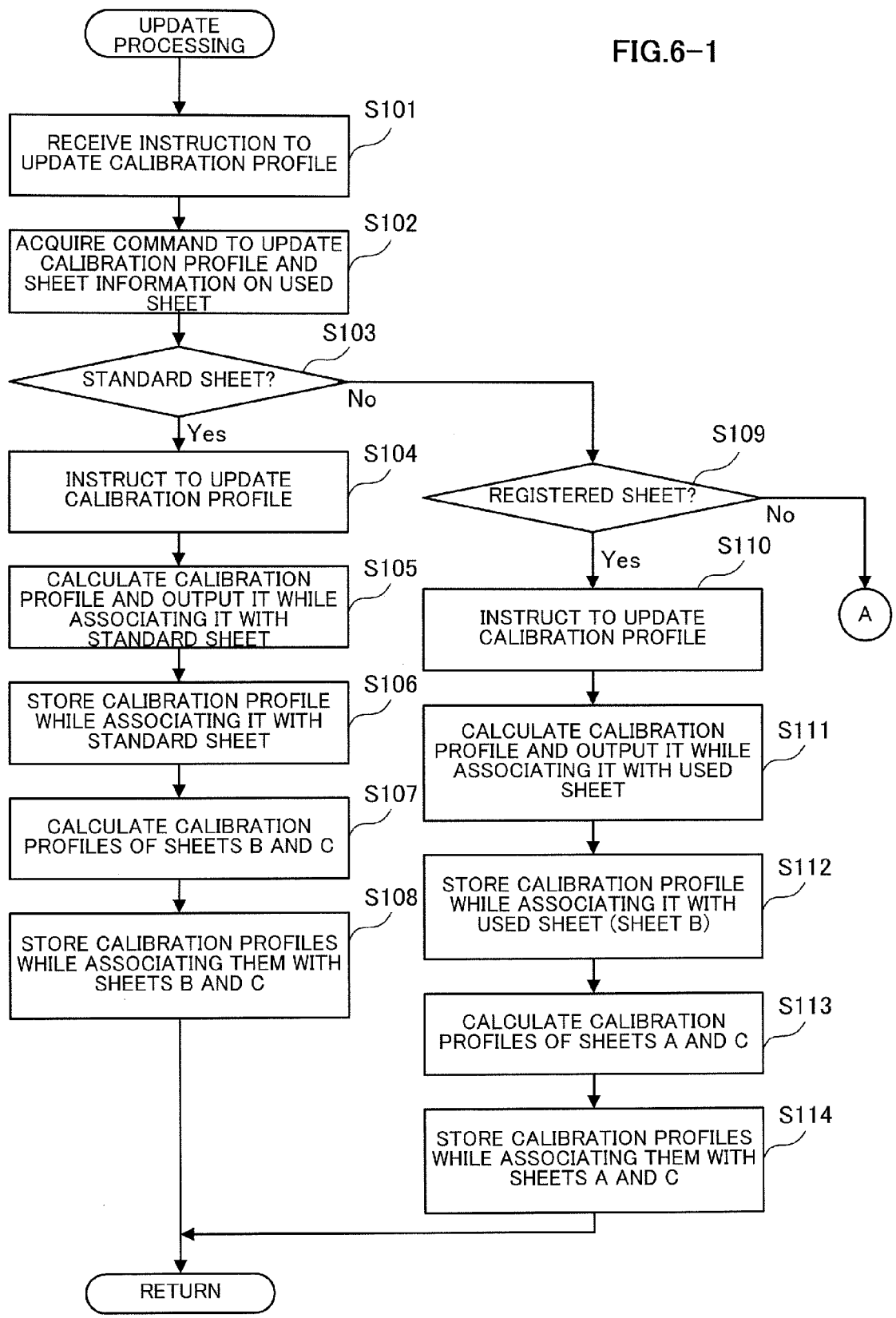

Next, FIGS. 6-1 and 6-2 are flowcharts showing an example of contents of processing for updating calibration profiles performed in the color adjustment processor 20.

As shown in FIG. 6-1, when the UI unit 60 receives, from a user, an instruction to update a calibration profile (Step 101), the color adjustment controller 24 acquires, from the system controller 30, a command to update the calibration profile and sheet information on a sheet on which the color chart is formed (a "used sheet," below) (Step 102). Here, such a configuration may made that, in this event, a list of sheets for each of which a calibration profile and a sheet-to-sheet conversion factor group are registered would be displayed on the display 70 and a user would choose a sheet for which the calibration profile is to be updated through the UI unit 60.

The color adjustment controller 24 judges whether or not the used sheet is the standard sheet (the sheet A, for example) that is used as a reference (center) in a one-dimensional LUT (sheet-to-sheet conversion factor group) registered in the sheet-to-sheet conversion-factor-group storage 27 on the basis of the acquired sheet information (Step 103).

If the used sheet is the standard sheet (Yes in Step 103), the color adjustment controller 24 instructs the adjustment conversion-factor-group calculation portion 25 and the update portion 28 to update the calibration profile (Step 104). Thereby, the adjustment conversion-factor-group calculation portion 25 calculates a calibration profile (four-dimensional LUT) by using the measured color data acquired from the measured color data storage 23 and the standard data acquired from the standard data storage 22, and outputs, to the update portion 28, the calibration profile while associating the calibration profile with the standard sheet (Step 105).

The update portion 28 stores, in the adjustment conversion-factor-group storage 51, the calibration profile calculated by the adjustment conversion-factor-group calculation portion 25, while associating the calibration profile with the standard sheet (sheet A) (Step 106). Thereby, the calibration profile of the standard sheet (sheet A) stored in the adjustment conversion-factor-group storage 51 is rewritten.

Subsequently, the update portion 28 acquires, from the sheet-to-sheet conversion-factor-group storage 27, the one-dimensional LUT (sheet A→sheet B conversion factor group) and the one-dimensional LUT (sheet A→sheet C conversion factor group). Then, the update portion 28 calculates a calibration profile of the sheet B and the calibration profile of the sheet C on the basis of the acquired one-dimensional LUT and the calibration profile of the standard sheet (sheet A) stored in the adjustment conversion-factor-group storage 51, by using the above-described method (single calculation) (Step 107). The update portion 28 stores, in the adjustment conversion-factor-group storage 51, the calculated calibration profiles while associating the calibration profiles with the sheet B and the sheet C, respectively (Step 108). Thereby, the calibration profiles of the sheet B and the sheet C stored in the adjustment conversion-factor-group storage 51 are rewritten.

Then, the color adjustment processor 20 terminates the processing for updating the calibration profiles.

Meanwhile, if the used sheet is not the standard sheet (No in Step 103), the color adjustment controller 24 judges whether or not the used sheet is a sheet (for example, the sheet B or the sheet C) associated with the calibration profile of the standard sheet by the registered one-dimensional LUT (Step 109).

If the used sheet is a sheet registered so as to be associated with the standard sheet (a "registered sheet," below) (Yes in Step 109), the color adjustment controller 24 instructs the adjustment conversion-factor-group calculation portion 25 and the update portion 28 to update the calibration profile (Step 110). Thereby, the adjustment conversion-factor-group calculation portion 25 calculates a calibration profile (four-dimensional LUT) by using the measured color data acquired from the measured color data storage 23 and the standard data acquired from the standard data storage 22, and then outputs, to the update portion 28, the calibration profile while associating the calibration profile with the used sheet (Step 111).

The update portion 28 stores, in the adjustment conversion-factor-group storage 51, the calibration profile calculated by the adjustment conversion-factor-group calculation portion 25 while associating the calibration profile with the used sheet (the sheet B, for example) (Step 112). Thereby, the calibration profile of the sheet B stored in the adjustment conversion-factor-group storage 51 is rewritten.

Subsequently, the update portion 28 acquires, from the sheet-to-sheet conversion-factor-group storage 27, the one-dimensional LUT (sheet B→sheet A conversion factor group) and the one-dimensional LUT (sheet A→sheet C conversion factor group). Then, on the basis of the acquired one-dimensional LUTs and the calibration profile of the used sheet (sheet B) stored in the adjustment conversion-factor-group storage 51, the update portion 28 calculates a calibration profile of the sheet A by the above-described method (single calculation) and a calibration profile of the sheet C by the above-described method (double calculation) (Step 113). The update portion 28 stores, in the adjustment conversion-factor-group storage 51, the calculated calibration profiles while associating the calibration profiles with the sheet A and the sheet C, respectively (Step 114). Thereby, the calibration profiles of the sheet A and the sheet C stored in the adjustment conversion-factor-group storage 51 are rewritten.

Then, the color adjustment processor 20 terminates the processing for updating the calibration profiles.

Next, proceed to FIG. 6-2. If the used sheet (an example of a first one of the sheets) is neither the standard sheet nor any of the registered sheets (the sheet B and the sheet C) (No in Step 103 and No in Step 109), the color adjustment controller 24 acquires, from the system controller 30, sheet information on sheets contained in the sheet containers 41, 42 and 43 of the image formation function unit 40 (Step 115).

Then, if the standard sheet (the sheet A) or any of the registered sheets (the sheet B and the sheet C) is contained in any of the sheet containers 41, 42 and 43 of the image formation function unit 40 (Yes in Step 116), the color adjustment controller 24, which also functions as an example of a print instruction unit, instructs the system controller 30 to print, by using the image formation function unit 40, the color chart as an example of the color sample groups on the corresponding one of the standard sheet and the registered sheet (the standard sheet, here) in addition to the current used sheet (Step 117). Here, if the standard sheet is contained in any of the sheet containers 41, 42 and 43 in this event, the standard sheet is to have a high priority as the target on which the color chart is to be printed.

At the same time, the color adjustment controller 24 causes the system controller 30 to display, on the display 70, an instruction for a user to measure the colors of the patches formed in the color chart printed on the standard sheet (an example of a second one of the sheets) by using the colorimeter 5 (Step 118).

Meanwhile, if none of the standard sheet (the sheet A) and the registered sheets (the sheet B and the sheet C) are contained in the sheet containers 41, 42 and 43 of the image formation function unit 40 (No in Step 116), the color adjustment controller 24 causes the system controller 30 to display, on the display 70, an instruction for a user to contain the standard sheet in any of the sheet containers 41, 42 and 43 (Step 119). Then, returning to Step 115, the color adjustment controller 24 again acquires, from the system controller 30, sheet information on the sheets contained in the sheet containers 41, 42 and 43 of the image formation function unit 40.

When a user measures the colors of the patches formed in the color chart printed on the standard sheet by using the colorimeter 5, and the measured color data on the used sheet and the standard sheet are inputted to the measured color data inputting portion 21 and then stored in the measured color data storage 23 (Step 120), the color adjustment controller 24 instructs the adjustment conversion-factor-group calculation portion 25 and the update portion 28, to update the calibration profile of the used sheet (Step 121). Thereby, by using the measured color data on the used sheet and the standard sheet acquired from the measured color data storage 23 and the standard data acquired from the standard data storage 22, the adjustment conversion-factor-group calculation portion 25 calculates a calibration profile of the used sheet (an example of a first one of the adjustment conversion factor groups) and a calibration profile of the standard sheet (an example of a second one of the adjustment conversion factor groups), and then outputs, to the update portion 28, the calculated calibration profiles while associating the calibration profiles with the used sheet (the sheet D, for example) and the standard sheet, respectively (Step 122).

The update portion 28 stores, in the adjustment conversion-factor-group storage 51, the calibration profile of the used sheet calculated by the adjustment conversion-factor-group calculation portion 25, while associating the calibration profile with the used sheet (the sheet D) (Step 123). Thereby, the calibration profile of the sheet D is newly stored in the adjustment conversion-factor-group storage 51. In this event, the update portion 28 may also store, in the adjustment conversion-factor-group storage 51, the calibration profile of the standard sheet calculated by the adjustment conversion-factor-group calculation portion 25, while associating the calibration profile with the standard sheet. Thereby, the calibration profile of the standard sheet is rewritten.

Subsequently, the color adjustment controller 24 instructs the sheet-to-sheet conversion-factor-group calculation portion 26 to calculate sheet-to-sheet conversion factor groups that associate the calibration profile of the used sheet (sheet D) (the example of the first one of the adjustment conversion factor groups) and the calibration profile of the standard sheet (the example of the second one of the adjustment conversion factor groups) with each other (Step 124). Thereby, the sheet-to-sheet conversion-factor-group calculation portion 26 acquires sheet information from the color adjustment controller 24 (Step 125). Moreover, the sheet-to-sheet conversion-factor-group calculation portion 26 acquires, from the measured color data storage 23, measured primary-color data on the used sheet and measured primary-color data on the standard sheet (Step 126), and then calculates sheet-to-sheet conversion factor groups that associate the calibration profile of the used sheet (sheet D) and the calibration profile of the standard sheet with each other by using the above-described method (Step 127). In this event, both a one-dimensional LUT that associates adjustment values for the used sheet with adjustment values for the standard sheet and a one-dimensional LUT that associates the adjustment values for the standard sheet with the adjustment values for the used sheet are calculated for each color component as described above.

Then, the sheet-to-sheet conversion-factor-group calculation portion 26 stores the calculated sheet-to-sheet conversion factor groups in the sheet-to-sheet conversion-factor-group storage 27 (Step 128). Thereafter, the color adjustment processor 20 terminates the processing for updating the calibration profiles.

In Step 113 shown in FIG. 6-1, the calibration profile of the sheet C is calculated by the above-described double calculation. Here, the following configuration may be made. Specifically, for example, if a one-dimensional LUT (sheet B→sheet C conversion factor group) is calculated in advance from the one-dimensional LUT (sheet B→sheet A conversion factor group) and the one-dimensional LUT (sheet A→sheet C conversion factor group) and is registered in the sheet-to-sheet conversion-factor-group storage 27, the user is allowed to choose, at the UI unit 60 functioning also as an example of a receiving unit, whether to calculate a calibration profile of the sheet C by the double calculation used here or to calculate a calibration profile of the sheet C by single calculation using the one-dimensional LUT (sheet B→sheet C conversion factor group). By using single calculation, errors occurring every time calculation is performed are reduced, which improves the accuracy compared with double calculation.

In the above description, an example of using a one-dimensional LUT as each conversion factor group between sheets having different characteristics is used. However, the present invention is not limited to such a conversion factor group constituted of a one-dimensional LUT, and may use a multi-dimensional LUT such as, for example, a four-dimensional LUT, as a conversion factor group. In this case, a conversion factor group may be calculated by the same method as that in the case of calculating a calibration profile.

As described above, in the color adjustment processor 20 of the present exemplary embodiment, a correspondence relationship between each two of various calibration profiles, which are different according to the types of used sheets, is obtained in advance. Then, for example, if the calibration profile of one sheet (the standard sheet) is updated, the calibration profiles of the other sheets are also updated by using the correspondence relationship between the updated calibration profile of the one sheet and the calibration profile of each of the various sheets. Accordingly, by updating the calibration profile of the one sheet, the calibration profiles of the multiple sheets are updated. Hence, even when the sheet to be used is changed, the frequency of newly updating the calibration profile of the sheet is reduced, and calibration (adjustment) on image data is performed more efficiently. In addition, since the calibration profiles of the various sheets are updated, calibration is performed at higher accuracy than the case of substituting the calibration profile of a different sheet, when the sheet to be used is changed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a color conversion unit that color-converts an image signal of a first color space into an image signal of a second color space by using a color conversion characteristic defining a correspondence relationship between the image signal of the first color space and the image signal of the second color space;
an adjustment unit that adjusts the image signal of the second color space, which is color-converted by the color conversion unit, by using adjustment conversion factor groups, the adjustment conversion factor groups being for adjusting the image signal of the second color space in accordance with a change in the color conversion characteristic, and being set for respective types of sheets on which an image is to be printed on the basis of the image signal of the second color space;
a calculation unit that calculates the adjustment conversion factor groups set in the adjustment unit;
a memory that stores an associating factor group associating, with each other, the adjustment conversion factor groups of the respective types of sheets set in the adjustment unit; and
an update unit that updates the adjustment conversion factor groups of the respective types of sheets set in the adjustment unit, on the basis of one of the adjustment conversion factor groups of one sheet calculated by the calculation unit and the associating factor group stored in the memory,
wherein
when the update unit updates a first one of the adjustment conversion factor groups of a first one of the sheets for which the associating factor group is not stored in the memory, the calculation unit calculates the first one of the adjustment conversion factor groups of the first one of the sheets and also calculates a second one of the adjustment conversion factor groups of a second one of the sheets for which the associating factor group is stored in the memory, and
the image processing apparatus further comprises an associating-factor-group calculation unit that calculates the associating factor group associating, with each other, the first one of the adjustment conversion factor groups and the second one of the adjustment conversion factor groups, on the basis of the first one of the adjustment conversion factor groups and the second one of the adjustment conversion factor groups that are calculated by the calculation unit, and that stores, in the memory, the associating factor group thus calculated.

2. The image processing apparatus according to claim 1, further comprising a print instruction unit that provides an instruction to print a predetermined color sample group on the sheets, wherein,
when the associating-factor-group calculation unit calculates the associating factor group that associates the first one of the adjustment conversion factor groups and the second one of the adjustment conversion factor groups with each other, the print instruction unit provides an instruction to print the color sample group on the second one of the sheets in addition to the first one of the sheets.

3. The image processing apparatus according to claim 1, wherein, when updating one of the adjustment conversion factor groups of a third one of the sheets, the update unit updates the one of the adjustment conversion factor groups of the third one of the sheets and one of the adjustment conversion factor groups of a fourth one of the sheets on the basis of the one of the adjustment conversion factor groups of the third one of the sheets calculated by the calculation unit and the associating factor group that associates the one of the adjustment conversion factor groups of the third one of the sheets and the one of the adjustment conversion factor groups of the fourth one of the sheets with each other and that is stored in the memory.

4. The image processing apparatus according to claim 3, further comprising a receiving unit that receives, when the update unit updates one of the adjustment conversion factor groups of a fifth one of the sheets, a choice of whether the update is performed on the basis of one of the adjustment conversion factor groups of a sixth one of the sheets calculated by the calculation unit and the associating factor group that associates the one of the adjustment conversion factor groups of the sixth one of the sheets and the one of the adjustment conversion factor groups of the fifth one of the sheets with each other and that is stored in the memory, or the update is performed on the basis of the one of the adjustment conversion factor groups of the sixth one of the sheets calculated by the calculation unit, the associating factor group that associates the one of the adjustment conversion factor groups of the sixth one of the sheets and one of the adjustment conversion factor groups of a seventh one of the sheets with each other and that is stored in the memory, and the associating factor group that associates the one of the adjustment conversion factor groups of the seventh one of the sheets and the one of the adjustment conversion factor groups of the fifth one of the sheets with each other and that is stored in the memory.

5. An image forming system comprising:
an image processing unit that performs image processing on an image signal of a first color space to generate an image signal of a second color space; and
an image forming unit that forms an image on a recording medium on the basis of the image signal of the second color space generated by the image processing unit;
the image processing unit including:
a color conversion unit that color-converts the image signal of the first color space into the image signal of the second color space by using a color conversion characteristic defining a correspondence relationship between the image signal of the first color space and the image signal of the second color space;
an adjustment unit that adjusts the image signal of the second color space, which is color-converted by the color conversion unit, by using adjustment conversion factor groups, the adjustment conversion factor groups being for adjusting the image signal of the second color space in accordance with a change in the color conversion characteristic, and being set for respective types of sheets on which an image is to be printed on the basis of the image signal of the second color space;
a calculation unit that calculates the adjustment conversion factor groups set in the adjustment unit;
a memory that stores an associating factor group associating, with each other, the adjustment conversion factor groups of the respective types of sheets set in the adjustment unit; and
an update unit that updates the adjustment conversion factor groups of the respective types of sheets set in the adjustment unit, on the basis of one of the adjustment conversion factor groups of one sheet calculated by the calculation unit and the associating factor group stored in the memory,
wherein
when the update unit updates a first one of the adjustment conversion factor groups of a first one of the sheets for which the associating factor group is not stored in the memory, the calculation unit of the image processing unit calculates the first one of the adjustment conversion factor groups of the first one of the sheets and also calculates a second one of the adjustment conversion factor groups of a second one of the sheets for which the associating factor group is stored in the memory, and
the image processing apparatus further comprises an associating-factor-group calculation unit that calculates the associating factor group associating, with each other, the first one of the adjustment conversion factor groups and the second one of the adjustment conversion factor groups, on the basis of the first one of the adjustment conversion factor groups and the second one of the adjustment conversion factor groups that are calculated by the calculation unit, and that stores, in the memory, the associating factor group thus calculated.

6. The image forming system according to claim 5, further comprising a print instruction unit that instructs the image forming unit to print a predetermined color sample group on the sheets, wherein,
when the associating-factor-group calculation unit of the image processing unit calculates the associating factor group that associates the first one of the adjustment conversion factor groups and the second one of the adjustment conversion factor groups with each other, the print instruction unit instructs the image forming unit to print the color sample group on the second one of the sheets in addition to the first one of the sheets.

7. The image forming system according to claim 5, wherein, when updating one of the adjustment conversion factor groups of a third one of the sheets, the update unit of the image processing unit updates the one of the adjustment conversion factor groups of the third one of the sheets and one of the adjustment conversion factor groups of a fourth one of the sheets on the basis of the one of the adjustment conversion factor groups of the third one of the sheets calculated by the calculation unit and the associating factor group that associates the one of the adjustment conversion factor groups of the third one of the sheets and the one of the adjustment conversion factor groups of the fourth one of the sheets with each other and that is stored in the memory.

8. The image forming system according to claim 7, further comprising a receiving unit that receives, when the update unit of the image processing unit updates one of the adjustment conversion factor groups of a third one of the sheets, a choice of whether the update is performed on the basis of one of the adjustment conversion factor groups of a fourth one of the sheets calculated by the calculation unit and the associating factor group that associates the one of the adjustment conversion factor groups of the fourth one of the sheets and the one of the adjustment conversion factor groups of the third one of the sheets with each other and that is stored in the memory, or the update is performed on the basis of the one of the adjustment conversion factor groups of the fourth one of the sheets calculated by the calculation unit, the associating factor group that associates the one of the adjustment conversion factor groups of the fourth one of the sheets and one of the adjustment conversion factor groups of a fifth one of the sheets with each other and that is stored in the memory, and the associating factor group that associates the one of the adjustment conversion factor groups of the fifth one of the sheets and the one of the adjustment conversion factor groups of the third one of the sheets with each other and that is stored in the memory.

9. An image processing method of an image processing apparatus including an adjustment unit that adjusts an image signal of a second color space, which is color-converted by using a color conversion characteristic defining a correspondence relationship between an image signal of a first color space and the image signal of the second color space, by using adjustment conversion factor groups, the adjustment conversion factor groups being for adjusting the image signal of the second color space in accordance with a change in the color conversion characteristic, and being set for respective types of sheets on which an image is to be printed on the basis of the image signal of the second color space, the image processing method comprising:

calculating the adjustment conversion factor groups;

updating the adjustment conversion factor groups of the respective types of sheets, on the basis of one of the adjustment conversion factor groups of one sheet thus calculated and an associating factor group that associates the adjustment conversion factor groups of the respective types of sheets with each other and that is stored in a memory; and calculating the associating factor group associating, with each other, a first one of the adjustment conversion factor groups of a first one of the sheets and a second one of the adjustment conversion factor groups of a second one of the sheets, on the basis of the first one of the adjustment conversion factor groups and the second one of the adjustment conversion factor groups, the associating factor group for the second one of the adjustment conversion factor groups being stored in the memory.

10. A non-transitory computer readable medium storing a program causing a computer to execute a process for image processing, the process comprising:

adjusting an image signal of a second color space, which is color-converted by using a color conversion characteristic defining a correspondence relationship between an image signal of a first color space and the image signal of the second color space, by using adjustment conversion factor groups, the adjustment conversion factor groups being for adjusting the image signal of the second color space in accordance with a change in the color conversion characteristic, and being set for respective types of sheets on which an image is to be printed on the basis of the image signal of the second color space;

calculating the adjustment conversion factor groups;

updating the adjustment conversion factor groups of the respective types of sheets, on the basis of one of the adjustment conversion factor groups of one sheet thus calculated and an associating factor group that associates the adjustment conversion factor groups of the respective types of sheets with each other and that is stored in a memory; and calculating the associating factor group associating, with each other, a first one of the adjustment conversion factor groups of a first one of the sheets and a second one of the adjustment conversion factor groups of a second one of the sheets, on the basis of the first one of the adjustment conversion factor groups and the second one of the adjustment conversion factor groups, the associating factor group for the second one of the adjustment conversion factor groups being stored in the memory.

11. The non-transitory computer readable medium according to claim 10, wherein updating the adjustment conversion factor groups of the respective types of sheets updates, when updating one of the adjustment conversion factor groups of a third one of the sheets, the one of the adjustment conversion factor groups of the third one of the sheets and one of the adjustment conversion factor groups of a fourth one of the sheets on the basis of the one of the adjustment conversion factor groups of the third one of the sheets thus calculated and the associating factor group that associates the one of the adjustment conversion factor groups of the third one of the sheets and the one of the adjustment conversion factor groups of the fourth one of the sheets with each other and that is stored in the memory.

12. The non-transitory computer readable medium according to claim 10, further comprising receiving, when one of the adjustment conversion factor groups of a third one of the sheets is updated, a choice of whether the update is performed on the basis of one of the adjustment conversion factor groups of a fourth one of the sheets thus calculated and the associating factor group that associates the one of the adjustment conversion factor groups of the fourth one of the sheets and the one of the adjustment conversion factor groups of the third one of the sheets with each other and that is stored in the memory, or the update is performed on the basis of the one of the adjustment conversion factor groups of the fourth one of the sheets thus calculated, the associating factor group that associates the one of the adjustment conversion factor groups of the fourth one of the sheets and one of the adjustment conversion factor groups of a fifth one of the sheets with each other and that is stored in the memory, and the associating factor group that associates the one of the adjustment conversion factor groups of the fifth one of the sheets and the one of the adjustment conversion factor groups of the third one of the sheets with each other and that is stored in the memory.

* * * * *